April 7, 1942.   C. P. STAUFFER   2,278,714
REPAIR CLAMP FOR PIPES
Filed March 10, 1941
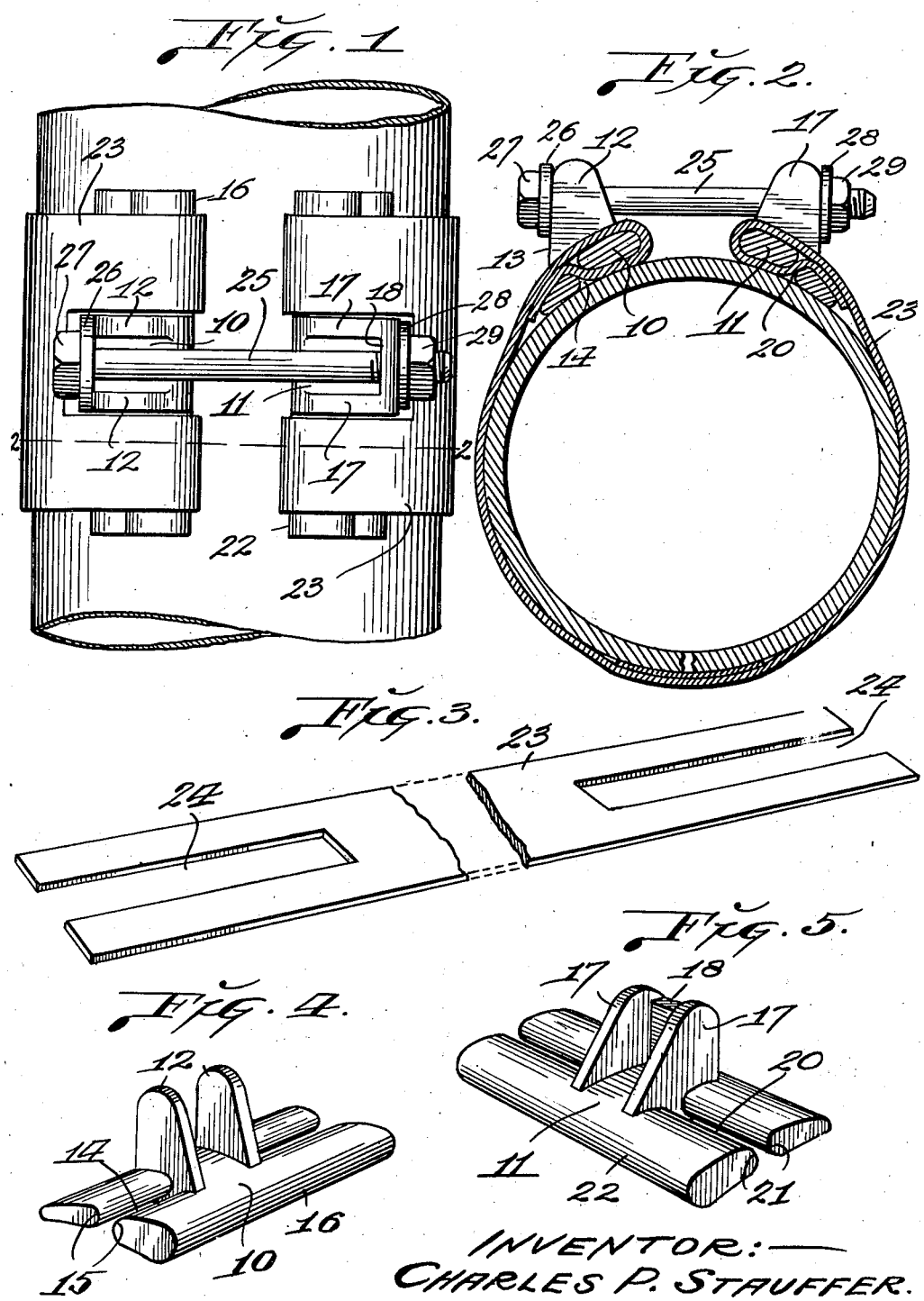
INVENTOR:—
CHARLES P. STAUFFER.

Patented Apr. 7, 1942

2,278,714

UNITED STATES PATENT OFFICE 2,278,714

REPAIR CLAMP FOR PIPES

Charles P. Stauffer, Bell, Calif.

Application March 10, 1941, Serial No. 382,473

3 Claims. (Cl. 138—99)

My invention relates to repair clamps for pipes and the construction herein disclosed is an improvement upon the repair clamps patented by me May 9, 1933, No. 1,907,889, and No. 2,213,022, issued August 27, 1940.

The principal objects of my present invention are, to generally improve upon and simplify the construction of the repair clamps disclosed in my aforesaid patents, as well as other existing forms of similar clamps, and further, to provide a clamp of relatively simple, practical, and inexpensive construction, that may be easily and quickly applied to pipes serving as conduits for water, gas, steam, air, or other fluids and liquids, for the purpose of effectively closing and sealing cracks, breaks, or punctures that may develop in said pipes.

A further object of my invention is, to provide a repair clamp of the character referred to having a pair of blocks that rest directly upon the pipe that is being repaired, said blocks being equipped with simple means for drawing the same toward each other to clamp a band of thin sheet metal or the like upon the pipe so as to close the crack, break, or puncture therein, and the ends of said blocks being provided with longitudinally disposed slots for the reception of the slotted or bifurcated ends of the flexible repair band that encircles the pipe, such structure being especially designed to firmly anchor the ends of the band to the blocks and to prevent slippage of the band when the same is tightened on the pipe.

With the foregoing and other objects in view, my invention consists in certain novel features of construction and arrangement of parts that will be hereinafter more fully described and claimed and illustrated in the accompanying drawing in which:

Fig. 1 is a plan view of a repair clamp constructed in accordance with my invention and showing the same in position upon a pipe.

Fig. 2 is a cross section taken on the line 2—2 of Fig. 1.

Fig. 3 is a perspective view of the thin flexible band that forms a part of the repair clamp.

Figs. 4 and 5 are perspective views of the blocks that provide anchors for the ends of the repair band.

Referring by numerals to the accompanying drawing which illustrates a preferred embodiment of my invention, 10 and 11 designate the band anchoring blocks of the clamp, which blocks are preferably cast from metal and provided with under faces that are curved transversely so as to conform to the curvature of the pipe to which the repair clamp is applied.

Formed integral with and projecting upwardly from the intermediate portion of block 10 is a pair of spaced lugs 12 having flat rear faces 13 that are disposed substantially at right angles to the plane occupied by the body of the block.

Formed in the end portions of block 10 and extending from the ends thereof inwardly to the lugs 12 are longitudinally disposed slots 14, the edges of which are rounded as designated by 15. The front edge of the block 10 is rounded as designated by 16.

Formed integral with the intermediate portion of block 11 is a pair of upwardly projecting spaced lugs 17 and connecting the rear edges of these lugs is a wall 18 which is perforated or provided with an opening for the accommodation of the bolt that draws the two parts of the clamp toward each other as hereinafter more fully described. The outer face of wall 18 is disposed substantially at right angles to the plane occupied by the body of the block 11. Formed in the end portions of block 11 and extending from the ends thereof inwardly to the lugs 17 are slots 20 having rounded edges 21. The front edge of block 11 is rounded as designated by 22.

The pipe encircling member 23 forming a part of the repair clamp and which is illustrated in Fig. 3 is preferably formed of sheet metal having a substantial degree of flexibility, for instance, copper, the width of said flexible member being substantially equal to or slightly less than the length of the blocks 10 and 11 and the length of said member being considerably greater than the circumference of the pipe to which the clamp is applied.

Extending inwardly from the ends of the band 23 are slots 24 of sufficient width to accommodate the lugs 12 and 17 on the blocks 10 and 11.

The means utilized for drawing the blocks 10 and 11 toward each other so as to clamp the repair band 23 on the pipe comprises a bolt 25, a washer 26 that is positioned against the head 27 of the bolt, and a washer 28 that is positioned beneath the nut 29 that is mounted on the threaded end of the bolt.

When the bolt 25 is applied to the blocks for the purpose of drawing the same toward each other, the washer 26 bears against the straight rear edges of lugs 12 with the head 27 of the bolt bearing against said washer and the threaded end of the bolt passes through the opening in wall 18 with washer 28 bearing against the outer face of said wall and nut 29 screw seated on the bolt and bearing against said washer.

The construction just described facilitates the application of the repair clamp to a pipe, also the removal of the repair clamp, for by slightly unscrewing nut 29 the headed end of the bolt may be drawn upward from its position between the lugs 27, thereby disconnecting the ends of the clamp.

When the clamp is applied for use, the slotted ends of the pipe encircling band are positioned over the blocks 10 and 11 with the pairs of lugs 12 and 17 projecting upwardly through the inner portions of the slots 24.

The portions of the band to the sides of the slots 24 are bent downwardly around the curved front edges 16 and 22 of the blocks 10 and 11, thence beneath the end portions of the blocks in front of the slots 14 and 20, thence upwardly through said slots and thence over those portions of the blocks to the rear of the slots in the ends thereof.

Thus the end portions of the band 23 have interlocking engagement with the slotted end portions of the blocks 10 and 11 and as the latter are drawn toward each other by manipulation of nut 29 on the threaded end of bolt 26, the band will be drawn very tightly around the pipe so as to effectively close the crack, break, or puncture therein.

In order to more effectively seal the crack or break in the pipe, a packing member of rubber, rubber impregnated fabric, leather, or the like, may be placed over the crack or break before the band is applied to the pipe.

The interlocking of the slotted ends of the band with the ends of the blocks and the extension of the terminal portions of the band outwardly between the outer portions of the blocks and the overlying portions of the pipe encircling band, is very effective in firmly anchoring the band to the blocks and slippage between the blocks and band is eliminated as the blocks are drawn toward each other to tighten the band on the pipe.

Thus it will be seen that I have provided a repair clamp for pipes that is relatively simple in construction, inexpensive of manufacture, and very effective in performing the functions for which it is intended.

It will be understood that minor changes in the size, form and construction of the various parts of my improved repair clamp for pipes, may be made and substituted for those herein shown and described, without departing from the spirit of my invention, the scope of which is set forth in the appended claims.

I claim as my invention:

1. A repair clamp for pipes comprising a pair of blocks, each formed in a single piece, means associated with said blocks for drawing the same together, the ends of said blocks being provided with longitudinally disposed slots open at their outer ends so as to provide pairs of spaced lugs, a one-piece band of flexible material adapted to encircle the pipe to which the clamp is applied and the ends of said band being slotted lengthwise to form spaced strips that pass over and beneath the forward lug of each pair, thence upwardly through the slots between said lugs and thence over the rear lug of each pair.

2. A repair clamp for pipes comprising a pair of blocks, each formed in a single piece, a lug formed on each block, means passing through said lugs for drawing the blocks toward each other, the ends of the blocks being slotted longitudinally to provide pairs of spaced lugs, a one-piece band of flexible material adapted to pass around the pipe to which the repair clamp is applied and the end portions of which band are slotted longitudinally for the accommodation of the lugs on said blocks and to provide spaced strips that pass over and beneath the forward lug of each pair, thence upwardly through the slots in the ends of said blocks and thence over the rear lug of each pair.

3. In a repair clamp for pipes, the combination with a pair of blocks, each formed in a single piece with the end portions thereof provided with longitudinally disposed slots open at their outer ends, of a one-piece band of flexible material adapted to encircle the pipe to which the repair clamp is applied, spaced strips on the ends of said band, portions of which strips overlie the slotted ends of said blocks and other portions of which strips underlie portions of the ends of said blocks in front of the slots therein and extend upwardly through said slots and between those portions of the ends of said blocks to the rear of the slots therein and the overlying portions of said band and means for drawing said blocks and the ends of the band that are connected to said blocks toward each other.

CHARLES P. STAUFFER.